United States Patent
Lockwood

(10) Patent No.: US 7,547,006 B1
(45) Date of Patent: Jun. 16, 2009

(54) FRUIT AND VEGETABLE GRIPPER

(76) Inventor: Tim Lockwood, P.O. Box 51256, Sparks, NV (US) 89435

( * ) Notice: Subject to any disclaimer, the term of this patent is extended or adjusted under 35 U.S.C. 154(b) by 0 days.

(21) Appl. No.: 11/975,630

(22) Filed: Oct. 22, 2007

(51) Int. Cl.
B25B 1/00 (2006.01)

(52) U.S. Cl. .................. 269/3; 269/6; 269/95; 269/102; 30/114

(58) Field of Classification Search ............ 269/3, 269/6, 95, 100, 102; 30/114, 304, 152, 298; 99/541; 36/61; 15/160, 186
See application file for complete search history.

(56) References Cited

U.S. PATENT DOCUMENTS

| | | | | |
|---|---|---|---|---|
| 4,096,629 A | * | 6/1978 | Levine | ............... 30/152 |
| 4,759,125 A | | 7/1988 | Olaes | |
| 5,125,333 A | * | 6/1992 | Gourley, III | ............ 100/94 |
| 5,325,596 A | * | 7/1994 | Baker | ............... 30/298 |
| 5,533,442 A | | 7/1996 | Tateno | |
| 5,613,431 A | | 3/1997 | Tatino | |
| 5,815,951 A | * | 10/1998 | Jordan | ............... 36/61 |
| 6,438,785 B1 | * | 8/2002 | Smith | ............. 15/160 |
| 6,516,519 B2 | | 2/2003 | Meyer | |
| 6,796,032 B2 | | 9/2004 | Horug | |
| D501,371 S | | 2/2005 | Lo | |
| 7,421,787 B2 | * | 9/2008 | White et al. | ............ 30/123 |
| 2003/0107225 A1 | * | 6/2003 | Martin | ............ 294/8.6 |
| 2007/0039193 A1 | * | 2/2007 | White et al. | ............ 30/298 |

* cited by examiner

*Primary Examiner*—Lee D Wilson
(74) *Attorney, Agent, or Firm*—Albert O. Cota

(57) ABSTRACT

A fruit and vegetable gripper (10) consisting of a resilient body (20) having a curved concave gripping surface (22) containing a number of slots (26), with a cutting shield (32) integrally formed within the body. A first insert (34) and a second insert (40) snap into the body, with each insert including gripping barbs (36) and (42) that penetrate the slots. When the gripper is manually held, the first insert gripping barbs (36) and second insert gripping barbs (42) are extended by hand pressure when a fruit or a vegetable is held, thereby achieving a positive non-slip grip.

15 Claims, 6 Drawing Sheets

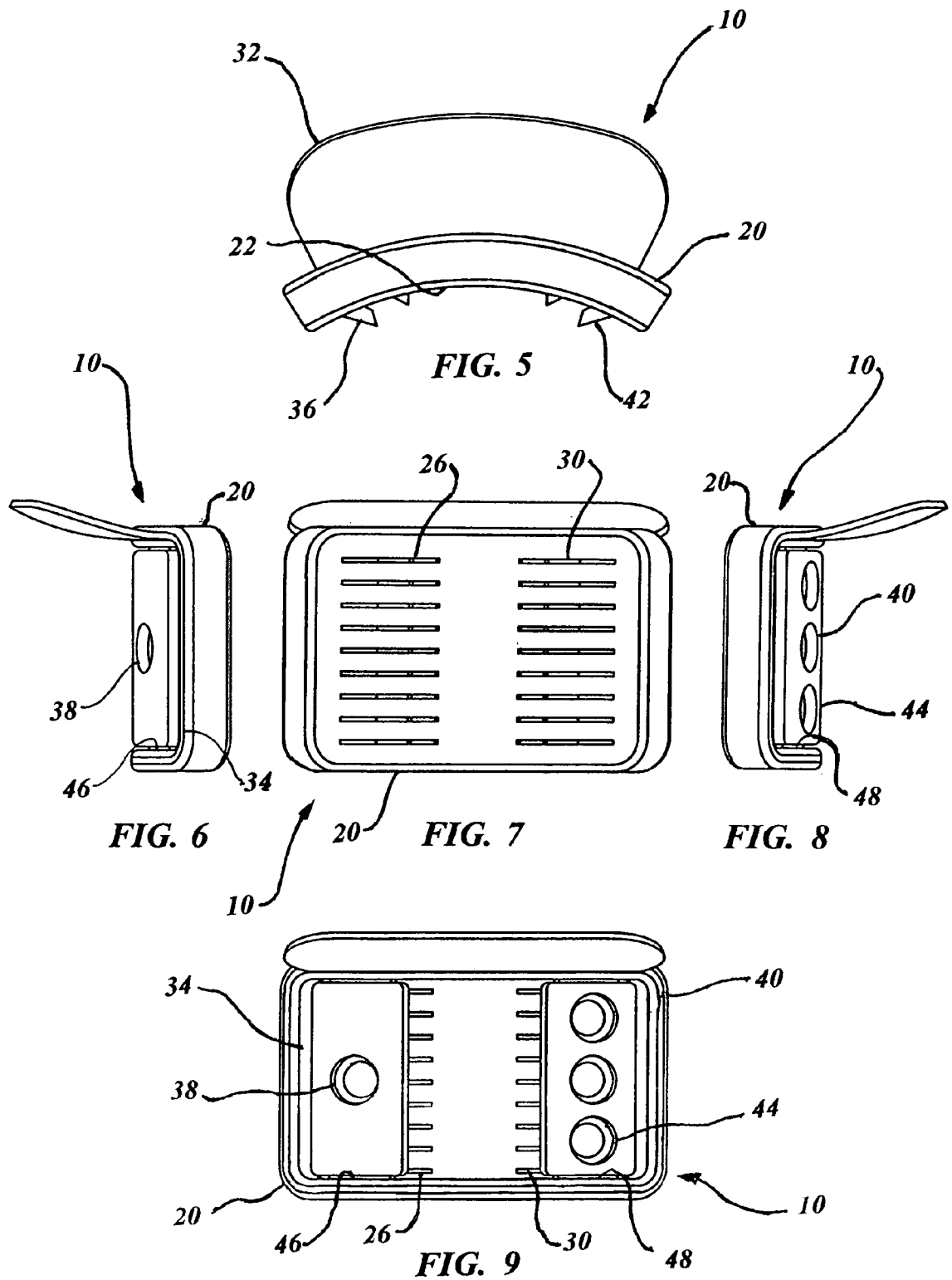

FRUIT AND VEGETABLE GRIPPER

TECHNICAL FIELD

The invention generally pertains to hand grippers, and more specifically to a gripper for holding a fruit or a vegetable when peeling or cutting the fruit or the vegetable with a knife.

BACKGROUND ART

Previously, many types of grips have been used in endeavoring to provide an effective means to hold items to prevent slipping when handling.

A search of the prior art did not disclose any patents that possess the novelty of the instant invention, however the following U.S. patents are considered related:

| Pat. No. | Inventor | Issue Date |
| --- | --- | --- |
| 4,759,125 | Olaes | Jul. 26, 1988 |
| 5,533,442 | Tateno | Jul. 9, 1996 |
| 5,613,431 | Tatino | Mar. 25, 1997 |
| 6,516,519 B2 | Meyer | Feb. 11, 2003 |
| 6,796,032 B2 | Horug | Sep. 28, 2004 |

Olaes in U.S. Pat. No. 4,759,125 teaches a scissor-like utensil having handles attached to blades for cutting and serving slices of a cake and similar goods. The handles have slots and are overlaid to obtain the optimum angle of the blades.

U.S. Pat. No. 5,533,442 issued to Tateno discloses a tool that is used to separate an avocado's meat from its skin, while simultaneously cutting the avocado's meat into separate slices. The tool has a handle with cutting rings consisting of an inner ring and an outer ring formed that are from a continuous band. The inner ring includes a set of elements having an aperture therethrough for the handle. Cutting blades are positioned on an inner wall of the inner ring and others are on the outer wall.

Tateno in U.S. Pat. No. 5,613,431 teaches a tool for separating the meat of an avocado from its skin, while simultaneously cutting the avocado's meat into separate slices. The tool has a frame mounted on one end of a handle and cutting elements are positioned on the frame, an elongated adjustment element extends through the handle and into the frame.

Meyer in U.S. Pat. No. 6,516,519 discloses a combination cutter and server having a set of flexible blades.

U.S. Pat. No. 6,796,032 issued to Horug discloses a fruit slicer which includes an X-hinged structure having two pivoting handles that separate the X-hinged structure into an upper portion and a lower portion. An elastic element is mounted between the handles for biasing the handles away from each other. An arcuate plate is deformed when the handles are pressed toward each other, thereby reducing the gap therebetween. When the handles are released, the shape of the arcuate plate is restored.

For background purposes and as indicative of the art to which the invention is related reference may be made to the remaining cited design patent issued to Lo in. U.S. patent D501,371.

DISCLOSURE OF THE INVENTION

Cutting or peeling fruits and vegetables often creates problems as the fruits and vegetables are often wet and slippery, particularly when only partially peeled. Not only can the fruits and vegetables slip from a person's hand, but when peeling with a knife the possibility of the knife slipping and cutting the hand holding the item poses a significant problem. Therefore, the primary object of the invention is to provide a gripper that solves the problems inherent in the prior art. Since fruits and vegetables are not symmetrical in shape the invention provides a number of barb inserts that protrude from the curved concave surface of the gripper's resilient body. The protrusion of the barbs is controlled by the pressure exerted from the thumb and fingers of a person who is operating the gripper such that soft fragile fruits or vegetables may be handled easily without any physical damage. The safety problem is solved by the use of a cutting shield that is integrally formed within the body of the gripper which is positioned in the appropriate location to prevent the knife blade from slipping into a person's hand. The shield protrudes above the gripper, completely protecting the person's entire hand.

An important object of the invention is that the gripper is easily cleaned as the barb inserts are removable, thereby allowing them to be cleaned separately and reinserted into the body by snapping them in place.

Another object of the invention is that the thumb recess in a first gripping barb insert and the finger recesses in a second gripping barb insert may be easily switched from one side to the other when used for a left handed person Still another object of the invention is that the entire gripper may be made by an injection molding process. The injection molding process makes the piece price reasonable even after the tooling cost is amortized, since the potential utilization of the invention is almost universal, thereby making use of economies of numbers.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a right side elevation view of the preferred embodiment.

FIG. 6 is a left end elevation view of the preferred embodiment.

FIG. 7 is a top elevation view of the preferred embodiment.

FIG. 8 is a right end elevation view of the preferred embodiment.

FIG. 9 is bottom elevation view of the preferred embodiment.

BEST MODE FOR CARRYING OUT THE INVENTION

Figure 1:
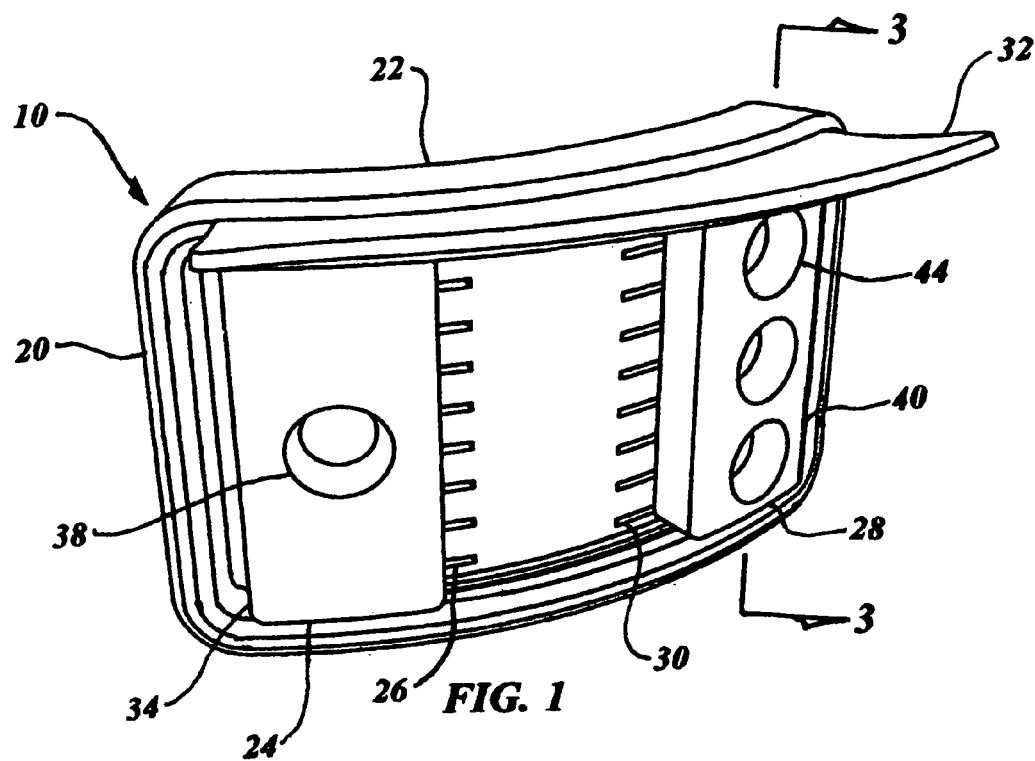
FIG. 1 is a partial isometric top view of the fruit and vegetable gripper in the preferred embodiment.
Figure 2:
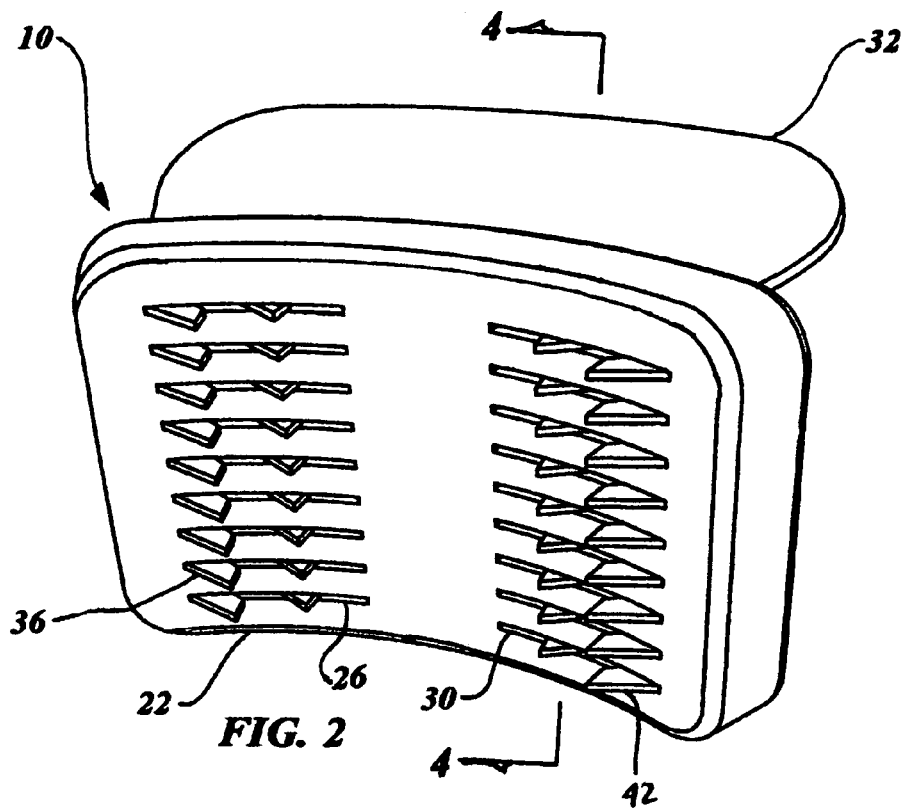
FIG. 2 is a partial isometric bottom view of the fruit and vegetable gripper in the preferred embodiment.
Figure 3:
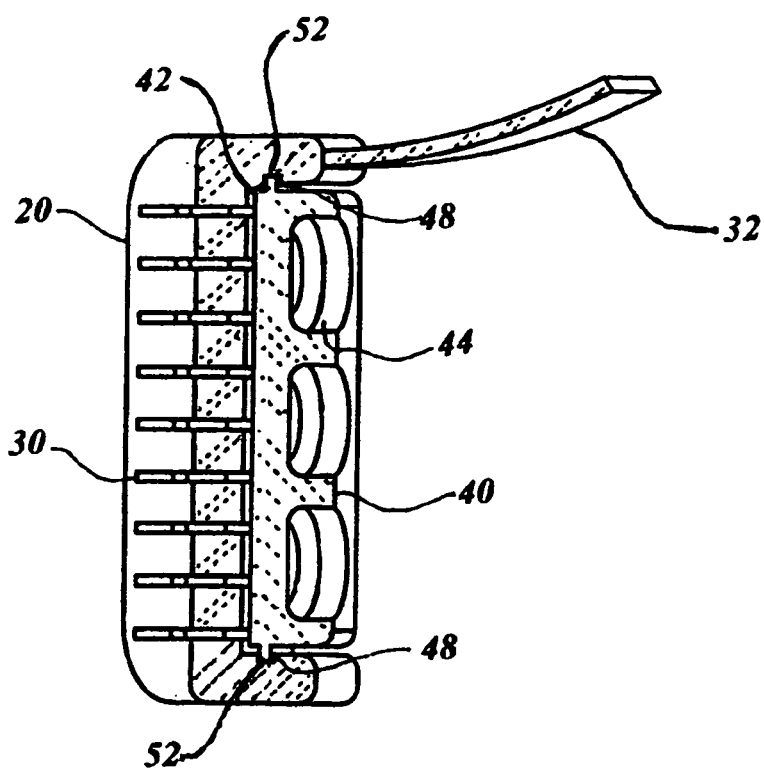
FIG. 3 is a cross-sectional view taken along lines 3-3 of FIG. 1.
Figure 4:
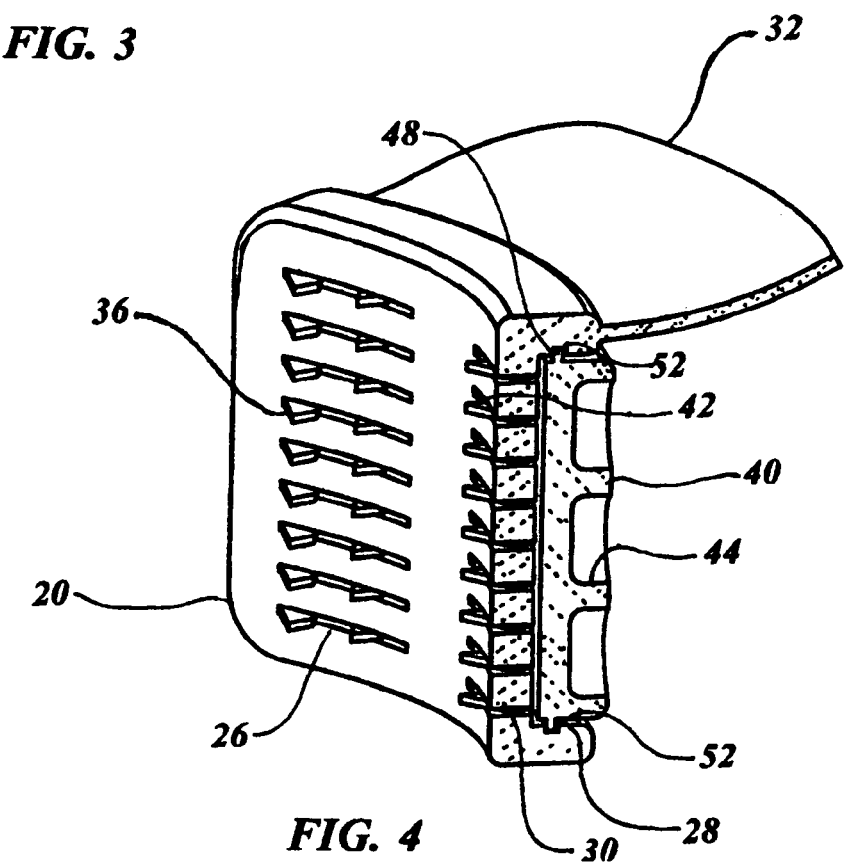
FIG. 4 is a cross-sectional view taken along lines 4-4 of FIG. 2.

The best mode for carrying out the invention is presented in terms of a preferred embodiment and second embodiment for a fruit and vegetable gripper 10. The preferred embodiment 10, as shown in FIGS. 1 through 10, is comprised of a resilient body 20 having a curved concave gripping surface 22, a first cavity 24 incorporating a plurality of slots 26 therethrough, and a second cavity 28 incorporating an equal number of slots 30. The first cavity slots 26 and the second cavity slots 30 are preferably separated apart from 15 to 25 percent of the width of the body 20. as illustrated in FIGS. 1-4, 7, 9 and 10. The body curved concave gripping surface 22 preferably has a radius varying from 30 to 35 percent of the body width. The body 20 includes radiused corners for ease of handling and is sufficiently resilient to flex around the fruit or vegetable being held.

A cutting shield 32 is integrally formed within the body 20 and is positioned above the curved concave gripping surface 22. The shield 32 is used for protecting a user's hand from the blade of a knife that slips when cutting or peeling the fruit or vegetable held by the gripper 10. The cutting shield 32, as illustrated best in FIG. 5, preferably has the same width as the body 20, a height 30 to 35 percent of the body width, and a thickness sufficient to cause the cutting shield 32 to stand alone and withstand hits from a knife blade.

Figure 10:
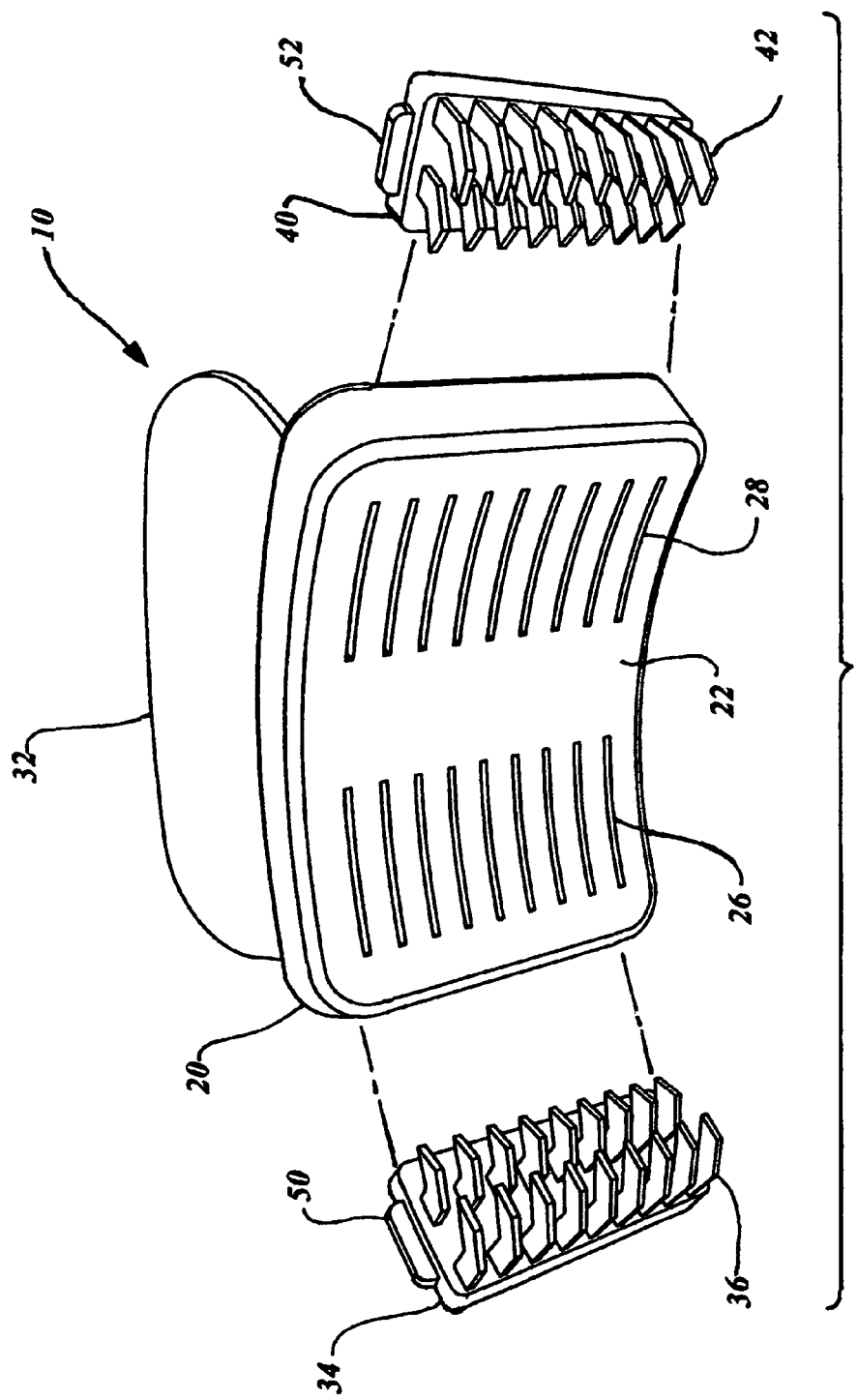
FIG. 10 is an exploded isometric view of the preferred embodiment.
Figure 11:
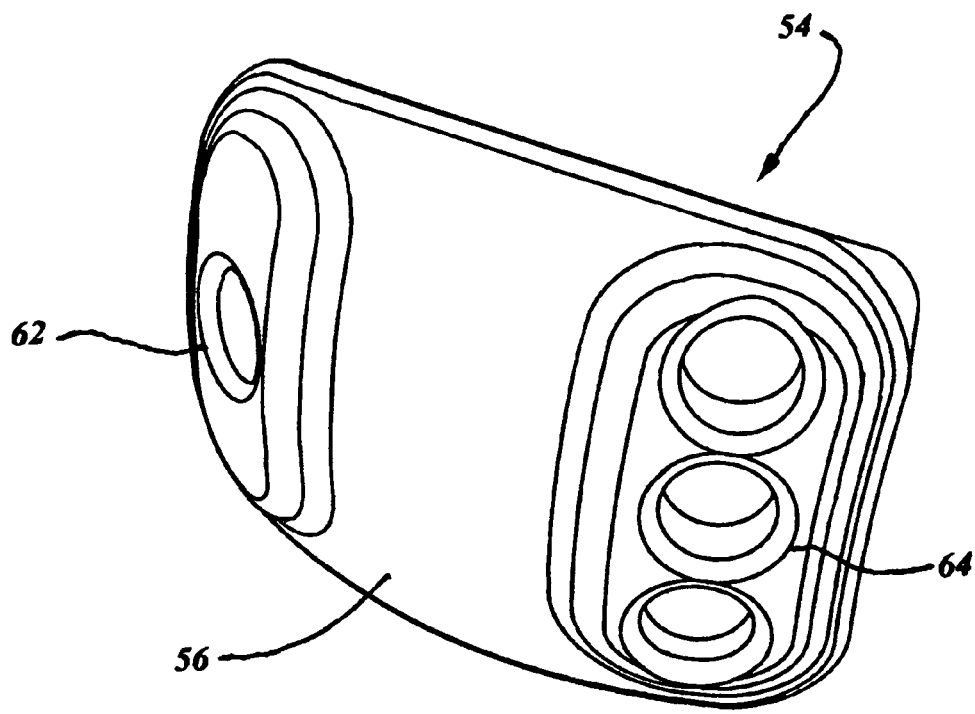
FIG. 11 is a partial isometric top view of the fruit and vegetable gripper in the second embodiment.
Figure 12:
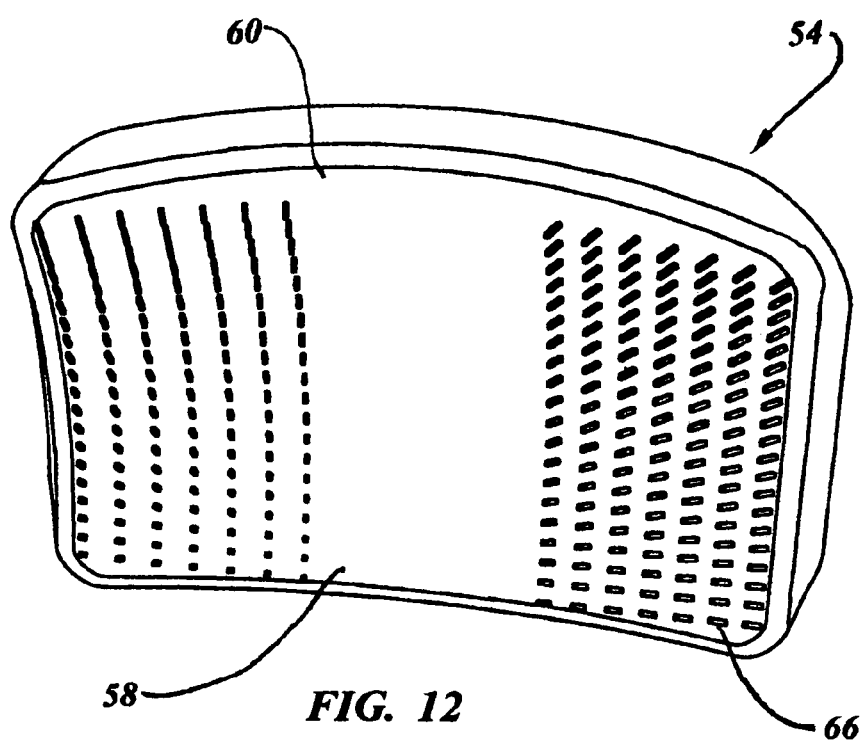
FIG. 12 is a partial isometric bottom view of the fruit and vegetable gripper in the second embodiment.

Snapped into the body first cavity 24 is a first insert 34 that incorporates a number of integral gripping barbs 36. Each barb 36 preferably has a shape that permits the barb to penetrate into each first cavity slot 26, as shown in FIGS. 1, 3, 4 and 10. The first insert preferably includes a thumb recess 38 in a top surface and at least eight barbs 36 extending from a bottom surface, with each barb having an offset shape with a right angle corner, as depicted in FIG. 10.

Snapped into the body second cavity 28 is a second insert 40 that incorporates a number of integral gripping barbs 42. Each barb 42 preferably has a shape that permits the barb to penetrate into each second cavity slot 30, as shown in FIGS. 1, 3, 4 and 10. The second insert preferably includes finger recesses 44 in a top surface and at least eight barbs 42 extending from a bottom surface, with each barb having an offset shape with a right angle corner, as depicted in FIG. 10.

In order to snap the first inserts 34 and the second inserts 40 into the body 20 the first cavity 24 includes first hollow recesses 46 therein and the body second cavity 28 also has similar second hollow recesses 48. The first insert 34 has first outward projections 50 configured to snap into the first hollow recesses 46 and the second insert 40 has second outward projections 52 configured to snap into the second hollow recesses 48, thereby permitting removal for cleaning.

The body 20, including the integral cutting shield 32, the first insert 34 and second insert 40, are preferably injection molded of a thermoplastic resin such as ABS, acetyl, acrylic, cellulose, Nylon, polycarbonate, polyethylene, polypropylene, polystyrene or vinyl.

When the gripper 10 is held, the first insert gripping barbs 36 and the second insert gripping barbs 42 are extended by manual pressure on the top surface of the inserts 34 and 40 when a piece of fruit or a vegetable is manually held in the gripper 10, a positive non-slip grip is achieved.

The second embodiment of the fruit and vegetable gripper 10, as illustrated in FIGS. 11 through 17, consists of a resilient body 54 having a top 56 and a bottom 58, with a curved concave gripping surface 60 on the bottom 58. A thumb recess 62 is formed in the top surface of the body 54 such that a person using the gripper may position his or her thumb to add support when gripping the body 54. A plurality of finger recesses 64 are also formed in the top surface of the body 54 such that a person using the gripper 10 may position his or her fingers to add support when gripping the body 54. A plurality of outward-facing barbs 66 extend from in the body concave surface 60 in a plurality of rows that holds fruit or a vegetable in a positive non-slip grip.

Figure 13:
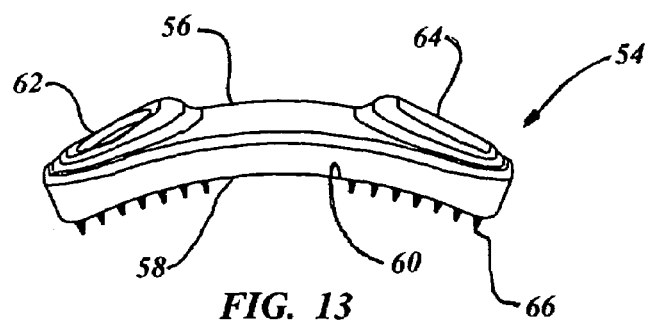
FIG. 13 is a right side elevation view of the second embodiment, with the left side elevation view a mirror image thereof.
Figure 14:
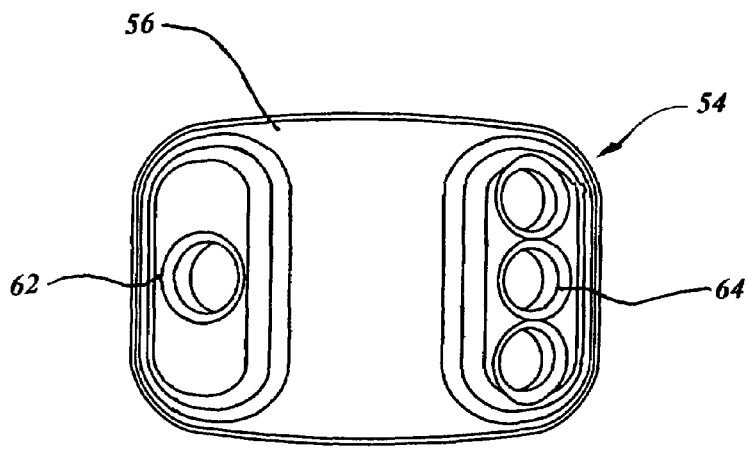
FIG. 14 is a top elevation view of the second embodiment.
Figures 15, 16, 17:
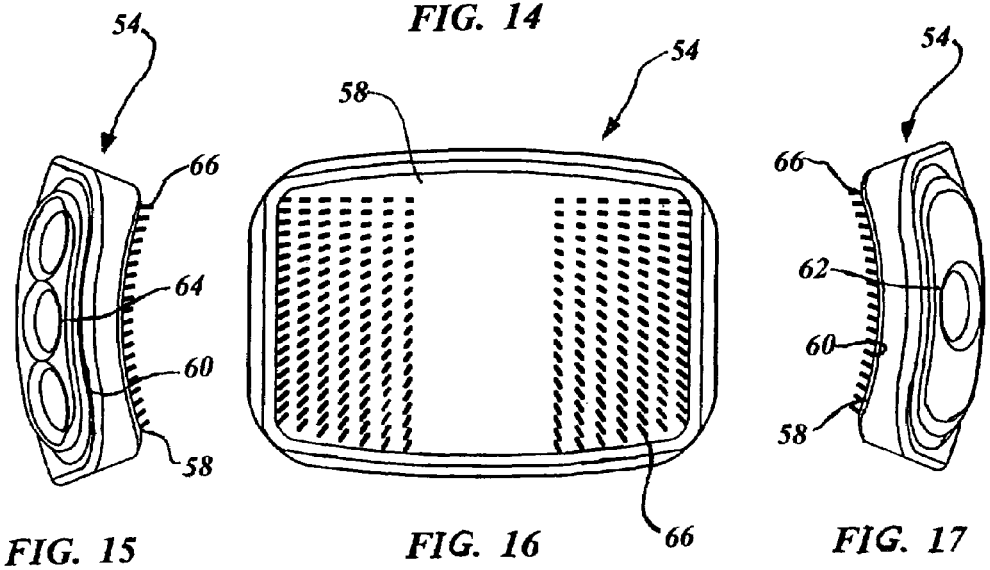
FIG. 15 is a left end elevation view of the second embodiment.
FIG. 16 is a bottom elevation view of the second embodiment.
FIG. 17 is right end elevation view of the second embodiment.

The barbs 66 are formed in rows in two discrete areas separated from each other, with a blank space between the barbs, with the barbs 66 having a wedge shape on the ends, as illustrated in FIG. 13. The body 54 is preferably injection molded with a thermoplastic resin such as ABS, acetyl, acrylic, cellulose, Nylon, polycarbonate, polyethylene, polypropylene, polystyrene, vinyl or the like.

The second embodiment of the fruit and vegetable gripper 10 functions in the same manner as the preferred embodiment, except it is fabricated in one piece and does not need to be taken apart for cleaning.

While the invention has been described in detail and pictorially shown in the accompanying drawings, it is not to be limited to such details, since many changes and modifications may be made to the invention without departing from the spirit and scope thereof. For example, in lieu of the formed barbs 66, the body 20 can be made of a thin flexible material into which a sharp piercing tool can be used to produce integral sharp projections. Hence, it is described to cover any and all modifications and forms which may come within the language and scope of the appended claims.

The invention claimed is:

1. A fruit and vegetable gripper which comprises:
   a) a resilient body having a curved concave gripping surface and a plurality of slots therethrough,
   b) a cutting shield that is integrally formed within the body and is positioned above the curved concave gripping surface,
   c) a first insert that is snapped into the body, the first insert having a plurality of gripping barbs attached thereunto penetrating into the body slots, and
   d) a second insert that is snapped into the body, the second insert having a plurality of gripping barbs attached thereunto penetrating into the body slots, wherein when the gripper is operated, the first insert barbs and second insert barbs are extended into a fruit or vegetable by hand pressure, thus achieving a positive non-slip grip.

2. A fruit and vegetable gripper which comprises:
   a) a resilient body having a curved concave gripping surface, wherein said body having a first cavity incorporating a plurality of slots therethrough, and a second cavity incorporating a plurality of slots therethrough,
   b) a cutting shield that is integrally formed within the body and is positioned above the curved concave gripping surface for protecting a user's hand,
   c) a first insert that is snapped into the body first cavity, wherein said first insert having a plurality of gripping barbs attached thereunto, with each barb having a shape permitting penetration into each first cavity slot, and
   d) a second insert that is snapped into the body second cavity, wherein said second insert having a plurality of gripping barbs attached thereunto, with each barb having a shape permitting penetration into each second cavity slot, such that when the gripper is manually held, the first insert barbs and second insert barbs are extended by manual pressure when a piece of fruit or a vegetable is held in the gripper, thereby achieving a positive non-slip grip.

3. The fruit and vegetable gripper as recited in claim 2 wherein said first cavity slots and said second cavity slots are separated 15 to 25 percent of the body width.

4. The fruit and vegetable gripper as recited in claim 2 wherein said body curved concave gripping surface having a radius 30 to 35 percent of the body width.

5. The fruit and vegetable gripper as recited in claim 2 wherein said body further having radiused corners.

6. The fruit and vegetable gripper as recited in claim 2 wherein said cutting shield has a width the same as the body width and a height 30 to 35 percent of the body width.

7. The fruit and vegetable gripper as recited in claim 2 wherein said cutting shield having a thickness sufficient to allow the shield to withstand hits from a knife.

8. The fruit and vegetable gripper as recited in claim 2 wherein said body first cavity having first hollow recesses therein, and said body second cavity having second hollow recesses therein, wherein said first insert having first outward projections configured to snap into said first hollow recesses, and said second insert having second outward projections configured to snap into said second hollow recesses, thereby permitting removal for cleaning.

9. The fruit and vegetable gripper as recited in claim 2 wherein said first insert having a thumb recess in a top surface thereof.

10. The fruit and vegetable gripper as recited in claim 2 wherein said first insert further comprises at least eight barbs extending therefrom.

11. The fruit and vegetable gripper as recited in claim 2 wherein each said first insert barb has an offset shape with a right angle corner.

12. The fruit and vegetable gripper as recited in claim 2 wherein said second insert having at least three finger recesses in a top surface thereof.

13. The fruit and vegetable gripper as recited in claim 2 wherein said second insert further comprises at least eight barbs extending therefrom.

14. The fruit and vegetable gripper as recited in claim 2 wherein each said second insert barb has an offset shape with a right angle corner.

15. The fruit and vegetable gripper as recited in claim 2 wherein said body, cutting shield, first insert and second insert are injection molded of a thermoplastic resin selected from the group consisting of ABS, acetyl, acrylic, cellulose, Nylon, polycarbonate, polyethylene, polypropylene, polystyrene and vinyl.

* * * * *